(12) United States Patent
Setlur et al.

(10) Patent No.: US 10,731,076 B2
(45) Date of Patent: Aug. 4, 2020

(54) PROCESSES FOR PREPARING STABLE RED-EMITTING PHOSPHORS

(71) Applicant: Current Lighting Solutions, LLC, East Cleveland, OH (US)

(72) Inventors: Anant Achyut Setlur, Niskayuna, NY (US); James Edward Murphy, Niskayuna, NY (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 226 days.

(21) Appl. No.: 15/794,759

(22) Filed: Oct. 26, 2017

(65) Prior Publication Data

US 2019/0127634 A1     May 2, 2019

Related U.S. Application Data

(60) Provisional application No. 62/428,743, filed on Dec. 1, 2016.

(51) Int. Cl.
    *C09K 11/61*     (2006.01)

(52) U.S. Cl.
    CPC .................. *C09K 11/617* (2013.01)

(58) Field of Classification Search
    CPC .................................................. C09K 11/617
    See application file for complete search history.

(56) References Cited

U.S. PATENT DOCUMENTS

| | | | |
|---|---|---|---|
| 3,623,994 A | 11/1971 | Royce et al. | |
| 5,523,655 A | 6/1996 | Jennato et al. | |
| 6,770,220 B1 | 8/2004 | Klimant | |
| 8,252,613 B1 * | 8/2012 | Lyons | C09K 11/617 438/46 |
| 9,745,540 B2 | 8/2017 | Wakui et al. | |
| 10,072,206 B2 * | 9/2018 | Murphy | C09K 11/616 |
| 2015/0364655 A1 | 12/2015 | Setlur et al. | |

FOREIGN PATENT DOCUMENTS

| | | |
|---|---|---|
| WO | 2000012649 A1 | 3/2000 |
| WO | 2015091716 A1 | 6/2015 |

OTHER PUBLICATIONS

Adachi et al., "Photoluminescent properties of K2GeF6:Mn4+ K2GeF6:Mn4+ red phosphor synthesized from aqueousHF/KMnO4HF/KMnO4 solution", Journal of Applied Physics, vol. 106, Issue: 1, 2009.
Arai et al., "A yellow phosphor K2SiF6K2SiF6 activated by Mn2+ Mn2+ ions", Journal of Applied Physics, vol. 108, Issue: 6, 2010.
Arai et al., "Mn-activated Na2SiF6 red and yellowish-green phosphors: A comparative study", Journal of Applied Physics, vol. 110, Issue: 6, 2011.
Hoshino et al., "Optical spectroscopy of ZnSiF6—6H2O:Mn4+ red phosphor", Journal of Applied Physics, vol. 114, Issue: 21, 2013.
Oyama et al., "Unique light-induced degradation in yellow-emitting K2SiF6:Mn2+ phosphor", Journal of Applied Physics, vol. 116, Issue: 13, 2014.
Kim et al., "Radiative and non-radiative decay rate of K2SiF6:Mn4+ phosphors", Journal of Materials Chemistry C, Issue: 21, pp. 5484-5489, 2015.
Lazarowska et al., "Pressure effect on the zero-phonon line emission of Mn4+ in K2SiF6", The Journal of Chemical Physics, vol. 143, Issue: 13, 2015.
Sijbom et al., "Luminescent behavior of the K2SiF6:Mn4+ red phosphor at high fluxes and at the microscopic level", ECS Journal of Solid State Science and Technology, vol. 5, Issue:1,pp. R3040-R3048, 2016.

* cited by examiner

*Primary Examiner* — C Melissa Koslow
(74) *Attorney, Agent, or Firm* — Buckley, Maschoff & Talwalkar LLC

(57) ABSTRACT

Processes for producing stable $Mn^{4+}$ doped phosphors include dispersing a compound of formula I in a solution comprising a compound of formula II to form a dispersion;

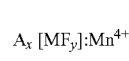

I

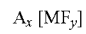

II applying pressure to the dispersion at a temperature less than 200° C. to form a phosphor product; and contacting the phosphor product with a fluorine-containing oxidizing agent in gaseous form at an elevated temperature;
  wherein
  A is Li, Na, K, Rb, Cs, or a combination thereof;
  M is Si, Ge, Sn, Ti, Zr, Al, Ga, In, Sc, Hf, Y, La, Nb, Ta, Bi, Gd, or a combination thereof;
  x is the absolute value of the charge of the $[MF_y]$ ion; and
  y is 5, 6 or 7.

27 Claims, 3 Drawing Sheets

PROCESSES FOR PREPARING STABLE RED-EMITTING PHOSPHORS

CROSS-REFERENCE TO RELATED APPLICATIONS

This application is a non-provisional of and claims priority from U.S. provisional application, Ser. No. 62/428,743, filed Dec. 1, 2016, the entire disclosure of which is incorporated herein by reference.

BACKGROUND

Red-emitting phosphors based on complex fluoride materials activated by $Mn^{4+}$, such as those described in U.S. Pat. Nos. 7,358,542, 7,497,973, and 7,648,649, can be utilized in combination with yellow/green emitting phosphors such as YAG:Ce or other garnet compositions to achieve warm white light (CCTs <5000 K on the blackbody locus, color rendering index (CRI) >80) from a blue LED, equivalent to that produced by current fluorescent, incandescent and halogen lamps. These materials absorb blue light strongly and efficiently emit between about 610-635 nm with little deep red/NIR emission. Therefore, luminous efficacy is maximized compared to red phosphors that have significant emission in the deeper red where eye sensitivity is poor. Quantum efficiency can exceed 85% under blue (440-460 nm) excitation.

While the efficacy and CRI of lighting systems using $Mn^{4+}$ doped fluoride hosts can be quite high, one potential limitation is their susceptibility to degradation under high temperature and humidity (HTHH) conditions. It is possible to reduce this degradation using post-synthesis processing steps, as described in U.S. Pat. No. 8,252,613. However, further improvement in stability of the materials is desirable.

BRIEF DESCRIPTION

Briefly, in one aspect, the present invention relates to processes for producing stable $Mn^{4+}$ doped phosphors. The processes include dispersing a compound of formula I in a solution comprising a compound of formula II to form a dispersion;

$A_x[MF_y]:Mn^{4+}$      I

$A_x[MF_y]$      II applying pressure to the dispersion at a temperature less than 200° C. to form a phosphor product; and contacting the phosphor product with a fluorine-containing oxidizing agent in gaseous form at an elevated temperature;

wherein

A is Li, Na, K, Rb, Cs, or a combination thereof;

M is Si, Ge, Sn, Ti, Zr, Al, Ga, In, Sc, Hf, Y, La, Nb, Ta, Bi, Gd, or a combination thereof;

x is the absolute value of the charge of the $[MF_y]$ ion; and y is 5, 6 or 7

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
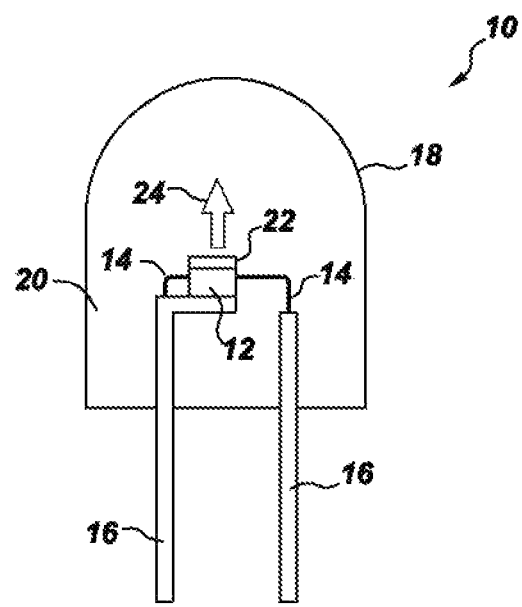
FIG. 1 is a schematic cross-sectional view of a lighting apparatus in accordance with one embodiment of the invention.

The $Mn^{4+}$ doped phosphors of formula I are complex fluoride materials, or coordination compounds, containing at least one coordination center, surrounded by fluoride ions acting as ligands, and charge-compensated by counter ions as necessary. For example, $K_2SiF_6:Mn^{4+}$, the coordination center is Si and the counterion is K. Complex fluorides are occasionally written as a combination of simple, binary fluorides but such a representation does not indicate the coordination number for the ligands around the coordination center. The square brackets (occasionally omitted for simplicity) indicate that the complex ion they encompass is a new chemical species, different from the simple fluoride ion. The activator ion ($Mn^{4+}$) also acts as a coordination center, substituting part of the centers of the host lattice, for example, Si. The host lattice (including the counter ions) may further modify the excitation and emission properties of the activator ion.

In particular embodiments, the coordination center of the precursor, that is, M in formula I, is Si, Ge, Sn, Ti, Zr, or a combination thereof. More particularly, the coordination center is Si, Ge, Ti, or a combination thereof, and the counterion, or A in formula I, is Na, K, Rb, Cs, or a combination thereof, and y is 6. Examples of precursors of formula I include $K_2[SiF_6]:Mn^{4+}$, $K_2[TiF_6]:Mn^{4+}$, $K_2[SnF_6]:Mn^{4+}$, $Cs_2[TiF_6]$, $Rb_2[TiF_6]$, $Cs_2[SiF_6]$, $Rb_2[SiF_6]$, $Na_2[TiF_6]:Mn^{4+}$, $Na_2[ZrF_6]:Mn^{4+}$, $K_3[ZrF_7]:Mn^{4+}$, $K_3[BiF_6]:Mn^{4+}$, $K_3[YF_6]:Mn^{4+}$, $K_3[LaF_6]:Mn^{4+}$, $K_3[GdF_6]:Mn^{4+}$, $K_3[NbF_7]:Mn^{4+}$, $K_3[TaF_7]:Mn^{4+}$. In particular embodiments, the precursor of formula I is $K_2SiF_6:Mn^{4+}$.

In a process according to the present invention, a phosphor or compound of formula I is first dispersed in a solution that includes a compound of formula II. Solutions for use in the process may include aqueous HF, aqueous hydrosilicic acid, aqueous $H_2TiF_6$, or organic solvents such as $C_1$-$C_{20}$ alcohols, including but not limited to ethanol and 2-propanol, $C_1$-$C_{20}$ ketones, including but not limited to acetone, $C_1$-$C_{20}$ carboxylic acids and esters, including but not limited to acetic acid and t-butyl acetate, and combinations thereof. The solutions may additionally include ionic compounds such as KF, $KH_2F$, NaF, $NaH_2F$, $K_2SiF_6$, $K_2TiF_6$, and combinations thereof. Examples of solutions that may be used with $K_2SiF_6:Mn^{4+}$ include KF and/or $KH_2F$ in aqueous HF, NaF and/or $NaH_2F$ in aqueous HF, $K_2SiF_6$ in aqueous HF, $K_2TiF_6$ in aqueous HF, aqueous hydrosilicic acid in aqueous HF, and aqueous $H_2TiF_6$ in aqueous HF. Use of a solution that contains a compound of formula II having a different coordination center may yield a material that has an alloyed core-shell structure. For example, dispersing $K_2TiF_6$:$Mn^{4+}$ in a solution containing $K_2SiF_6$ and/or $H_2SiF_6$ may yield a phosphor having a core composed of $K_2TiF_6$: $Mn^{4+}$ and a shell composed of $K_2SiF_6$:$Mn^{4+}$. Low particle size host material in solution may yield an undoped layer on the surface of the particle via Ostwaldt ripening. Less 10% host, cool slowly In a second step, pressure is applied to the dispersion at a temperature less than 200° C. to form a phosphor product. Any suitable manner of applying pressure may be used; for example, the phosphor may be contained in microwave digestion reactor or an autoclave. Suitable pressure for the process is less than 100 bar (10 MPa), particularly from about 60 bar (6 MPa) to about 100 bar (10 MPa). The time period for applying pressure is less than 4 hours, particularly less than 1 hour. Temperature ranges from about 100° C. to less than 200° C., particularly from about 130° C. to 160° C.

In some embodiments, the dispersion is exposed to microwave radiation while applying pressure. In particular, a microwave digestion reactor such as the UltraWAVE System from Milestone Inc. may be used. In some embodiments where a microwave digester, is used, no solvent is necessary, and the apparatus may be used to dry the phosphor.

After applying pressure, the phosphor product may be isolated by filtering the dispersion and dried. If desired, the filtrate may be treated with a concentrated solution of a compound of formula II in aqueous hydrofluoric acid. The compound of formula II includes at least the $MF_y$ anion of the host compound for the product phosphor, and may also include the $A^+$ cation of the compound of formula I. For a product phosphor of formula Mn-doped $K_2SiF_6$, suitable materials for the compound of formula II include $H_2SiF_6$, $Na_2SiF_6$, $(NH_4)_2SiF_6$, $Rb_2SiF_6$, $Cs_2SiF_6$, or a combination thereof, particularly $H_2SiF_6$, $K_2SiF_6$ and combinations thereof, more particularly $K_2SiF_6$. The treatment solution is a saturated or nearly saturated of the compound of formula II in hydrofluoric acid. A nearly saturated solution contains about 1-5% excess aqueous HF added to a saturated solution. Concentration of HF in the solution ranges from about 25% (wt/vol) to about 70% (wt/vol), in particular from about 40% (wt/vol) to about 50% (wt/vol). Less concentrated solutions may result in reduced performance of the phosphor. The amount of treatment solution used ranges from about 2-30 ml/g product, particularly about 5-20 ml/g product, more particularly about 5-15 ml/g product.

The treated phosphor may be vacuum filtered, and washed with one or more solvents to remove HF and unreacted raw materials. Suitable materials for the wash solvent include acetic acid and acetone, and combinations thereof.

The product phosphor is annealed after the pressure step, with an intervening treatment step if desired. During the anneal, the product phosphor is held at an elevated temperature, while in contact with an atmosphere containing a fluorine-containing oxidizing agent. The fluorine-containing oxidizing agent may be $F_2$, HF, $SF_6$, $BrF_5$, $NH_4HF_2$, $NH_4F$, KF, $AlF_3$, $SbF_5$, $ClF_3$, $BrF_3$, $KrF_2$, $XeF_2$, $XeF_4$, $NF_3$, $SiF_4$, $PbF_2$, $ZnF_2$, $SnF_2$, $CdF_2$ or a combination thereof. In particular embodiments, the fluorine-containing oxidizing agent is $F_2$. The amount of oxidizing agent in the atmosphere may be varied to obtain the color stable phosphor, particularly in conjunction with variation of time and temperature. Where the fluorine-containing oxidizing agent is $F_2$, the atmosphere may include at least 0.5% $F_2$, although a lower concentration may be effective in some embodiments. In particular the atmosphere may include at least 5% $F_2$ and more particularly at least 20% $F_2$. The atmosphere may additionally include nitrogen, helium, neon, argon, krypton, xenon, in any combination with the fluorine-containing oxidizing agent. In particular embodiments, the atmosphere is composed of about 20% $F_2$ and about 80% nitrogen.

The temperature at which the phosphor is contacted with the fluorine-containing oxidizing agent is any temperature in the range from about 200° C. to about 700° C., particularly from about 350° C. to about 600° C. during contact, and in some embodiments from about 500° C. to about 600° C. The phosphor is contacted with the oxidizing agent for a period of time sufficient to convert it to a color stable phosphor. Time and temperature are interrelated, and may be adjusted together, for example, increasing time while reducing temperature, or increasing temperature while reducing time. In particular embodiments, the time is at least one hour, particularly for at least four hours, more particularly at least six hours, and most particularly at least eight hours.

After holding at the elevated temperature for the desired period of time, the temperature in the furnace may be reduced at a controlled rate while maintaining the oxidizing atmosphere for an initial cooling period. After the initial cooling period, the cooling rate may be controlled at the same rate or a different rate, or may be uncontrolled. In some embodiments, the cooling rate is controlled at least until a temperature of 200° C. is reached. In other embodiments, the cooling rate is controlled at least until a temperature at which it is safe to purge the atmosphere is reached. For example, the temperature may be reduced to about 50° C. before a purge of the fluorine atmosphere begins. Reducing the temperature at a controlled rate of ≤5° C. per minute may yield a phosphor product having superior properties compared to reducing the temperature at a rate of 10° C./minute. In various embodiments, the rate may be controlled at ≤5° C. per minute, particularly at ≤3° C. per minute, more particularly at a rate of ≤1° C. per minute.

The period of time over which the temperature is reduced at the controlled rate is related to the contact temperature and cooling rate. For example, when the contact temperature is 540° C. and the cooling rate is 10° C./minute, the time period for controlling the cooling rate may be less than one hour, after which the temperature may be allowed to fall to the purge or ambient temperature without external control. When the contact temperature is 540° C. and the cooling rate is ≤5° C. per minute, then the cooling time may be less than two hours. When the contact temperature is 540° C. and the cooling rate is ≤3° C. per minute, then the cooling time may be less than three hours. When the contact temperature is 540° C. and the cooling rate is ≤1° C. per minute, then the cooling time is may be less than four hours. For example, the temperature may be reduced to about 200° C. with controlled cooling, then control may be discontinued. After the controlled cooling period, the temperature may fall at a higher or lower rate than the initial controlled rate.

The manner of contacting the phosphor with the fluorine-containing oxidizing agent is not critical and may be accomplished in any way sufficient to convert the phosphor to a color stable phosphor having the desired properties. In some embodiments, the chamber containing the phosphor may be dosed and then sealed such that an overpressure develops as the chamber is heated, and in others, the fluorine and nitrogen mixture is flowed throughout the anneal process ensuring a more uniform pressure. In some embodiments, an additional dose of the fluorine-containing oxidizing agent may be introduced after a period of time.

The annealed phosphor may be treated with the saturated or nearly saturated solution of a composition of formula II in aqueous hydrofluoric acid described above. The amount of treatment solution used ranges from about 10 ml/g product to 20 ml/g product, particularly about 10 ml/g product. The treated annealed phosphor may be isolated by filtration, washed with solvents such as acetic acid and acetone to remove contaminates and traces of water, and stored under nitrogen.

A lighting apparatus or light emitting assembly or lamp 10 according to one embodiment of the present invention is shown in FIG. 1. Lighting apparatus 10 includes a semiconductor radiation source, shown as light emitting diode (LED) chip 12, and leads 14 electrically attached to the LED chip. The leads 14 may be thin wires supported by a thicker lead frame(s) 16 or the leads may be self supported electrodes and the lead frame may be omitted. The leads 14 provide current to LED chip 12 and thus cause it to emit radiation.

The lamp may include any semiconductor blue or UV light source that is capable of producing white light when its emitted radiation is directed onto the phosphor. In one embodiment, the semiconductor light source is a blue emitting LED doped with various impurities. Thus, the LED may comprise a semiconductor diode based on any suitable III-V, II-VI or IV-IV semiconductor layers and having an emission wavelength of about 250 to 550 nm. In particular, the LED may contain at least one semiconductor layer comprising GaN, ZnSe or SiC. For example, the LED may comprise a nitride compound semiconductor represented by the formula $In_iGa_jAl_kN$ (where $0 \leq i$; $0 \leq j$; and $I+j+k=1$) having an emission wavelength greater than about 250 nm and less than about 550 nm. In particular embodiments, the chip is a near-uv or blue emitting LED having a peak emission wavelength from about 400 to about 500 nm. Such LED semiconductors are known in the art. The radiation source is described herein as an LED for convenience. However, as used herein, the term is meant to encompass all semiconductor radiation sources including, e.g., semiconductor laser diodes. Further, although the general discussion of the exemplary structures of the invention discussed herein is directed toward inorganic LED based light sources, it should be understood that the LED chip may be replaced by another radiation source unless otherwise noted and that any reference to semiconductor, semiconductor LED, or LED chip is merely representative of any appropriate radiation source, including, but not limited to, organic light emitting diodes.

In lighting apparatus 10, phosphor composition 22 is radiationally coupled to the LED chip 12. Radiationally coupled means that the elements are associated with each other so radiation from one is transmitted to the other. Phosphor composition 22 is deposited on the LED 12 by any appropriate method. For example, a water based suspension of the phosphor(s) can be formed, and applied as a phosphor layer to the LED surface. In one such method, a silicone slurry in which the phosphor particles are randomly suspended is placed around the LED. This method is merely exemplary of possible positions of phosphor composition 22 and LED 12. Thus, phosphor composition 22 may be coated over or directly on the light emitting surface of the LED chip 12 by coating and drying the phosphor suspension over the LED chip 12. In the case of a silicone-based suspension, the suspension is cured at an appropriate temperature. Both the shell 18 and the encapsulant 20 should be transparent to allow white light 24 to be transmitted through those elements. Although not intended to be limiting, in some embodiments, the median particle size of the phosphor composition ranges from about 1 to about 50 microns, particularly from about 15 to about 35 microns.

In other embodiments, phosphor composition 22 is interspersed within the encapsulant material 20, instead of being formed directly on the LED chip 12. The phosphor (in the form of a powder) may be interspersed within a single region of the encapsulant material 20 or throughout the entire volume of the encapsulant material. Blue light emitted by the LED chip 12 mixes with the light emitted by phosphor composition 22, and the mixed light appears as white light. If the phosphor is to be interspersed within the material of encapsulant 20, then a phosphor powder may be added to a polymer or silicone precursor, loaded around the LED chip 12, and then the polymer precursor may be cured to solidify the polymer or silicone material. Other known phosphor interspersion methods may also be used, such as transfer loading.

In some embodiments, the encapsulant material 20 is a silicone matrix having an index of refraction R, and, in addition to phosphor composition 22, contains a diluent material having less than about 5% absorbance and index of refraction of R±0.1. The diluent material has an index of refraction of $\leq 1.7$, particularly $\leq 1.6$, and more particularly $\leq 1.5$. In particular embodiments, the diluent material is of formula II, and has an index of refraction of about 1.4. Adding an optically inactive material to the phosphor/silicone mixture may produce a more gradual distribution of light flux through the phosphor/encapsulant mixture and can result in less damage to the phosphor. Suitable materials for the diluent include fluoride compounds such as $LiF$, $MgF_2$, $CaF_2$, $SrF_2$, $AlF_3$, $K_2NaAlF_6$, $KMgF_3$, $CaLiAlF_6$, $K_2LiAlF_6$, and $K_2SiF_6$, which have index of refraction ranging from about 1.38 ($AlF_3$ and $K_2NaAlF_6$) to about 1.43 ($CaF_2$), and polymers having index of refraction ranging from about 1.254 to about 1.7. Non-limiting examples of polymers suitable for use as a diluent include polycarbonates, polyesters, nylons, polyetherimides, polyetherketones, and polymers derived from styrene, acrylate, methacrylate, vinyl, vinyl acetate, ethylene, propylene oxide, and ethylene oxide monomers, and copolymers thereof, including halogenated and unhalogenated derivatives. These polymer powders can be directly incorporated into silicone encapsulants before silicone curing.

In yet another embodiment, phosphor composition 22 is coated onto a surface of the shell 18, instead of being formed over the LED chip 12. The phosphor composition is preferably coated on the inside surface of the shell 18, although the phosphor may be coated on the outside surface of the shell, if desired. Phosphor composition 22 may be coated on the entire surface of the shell or only a top portion of the surface of the shell. The UV/blue light emitted by the LED chip 12 mixes with the light emitted by phosphor composition 22, and the mixed light appears as white light. Of course, the phosphor may be located in any two or all three locations or in any other suitable location, such as separately from the shell or integrated into the LED.

Figure 2:
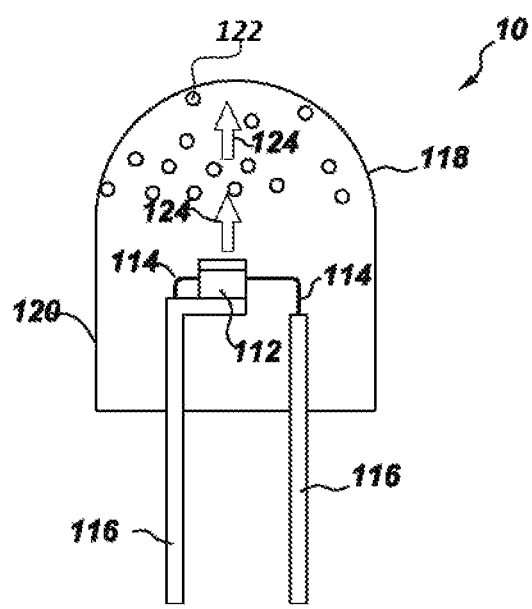
FIG. 2 is a schematic cross-sectional view of a lighting apparatus in accordance with another embodiment of the invention.

FIG. 2 illustrates a second structure of the system according to the present invention. Corresponding numbers from FIGS. 1-4 (e.g. 12 in FIGS. 1 and 112 in FIG. 2) relate to corresponding structures in each of the figures, unless otherwise stated. The structure of the embodiment of FIG. 2 is similar to that of FIG. 1, except that the phosphor composition 122 is interspersed within the encapsulant material 120, instead of being formed directly on the LED chip 112. The phosphor (in the form of a powder) may be interspersed within a single region of the encapsulant material or throughout the entire volume of the encapsulant material. Radiation (indicated by arrow 126) emitted by the LED chip 112 mixes with the light emitted by the phosphor 122, and the mixed light appears as white light 124. If the phosphor is to be interspersed within the encapsulant material 120, then a phosphor powder may be added to a polymer precursor, and loaded around the LED chip 112. The polymer or silicone precursor may then be cured to solidify the polymer or silicone. Other known phosphor interspersion methods may also be used, such as transfer molding.

Figure 3:
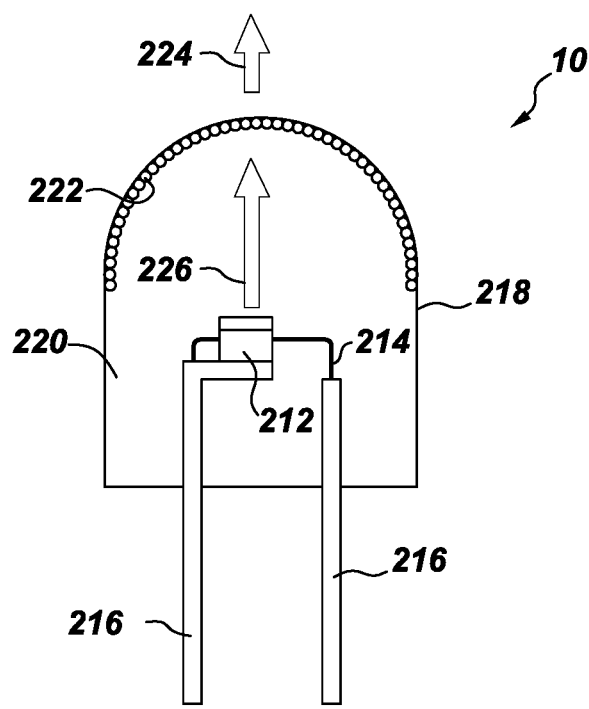
FIG. 3 is a schematic cross-sectional view of a lighting apparatus in accordance with yet another embodiment of the invention.

FIG. 3 illustrates a third possible structure of the system according to the present invention. The structure of the embodiment shown in FIG. 3 is similar to that of FIG. 1, except that the phosphor composition 222 is coated onto a surface of the envelope 218, instead of being formed over the LED chip 212. The phosphor composition 222 is preferably coated on the inside surface of the envelope 218, although the phosphor may be coated on the outside surface of the envelope, if desired. The phosphor composition 222 may be coated on the entire surface of the envelope, or only a top portion of the surface of the envelope. The radiation 226 emitted by the LED chip 212 mixes with the light emitted by the phosphor composition 222, and the mixed light appears as white light 224. Of course, the structures of FIGS. 1-3 may be combined, and the phosphor may be located in any two or all three locations, or in any other suitable location, such as separately from the envelope, or integrated into the LED.

In any of the above structures, the lamp may also include a plurality of scattering particles (not shown), which are embedded in the encapsulant material. The scattering particles may comprise, for example, alumina or titania. The scattering particles effectively scatter the directional light emitted from the LED chip, preferably with a negligible amount of absorption.

Figure 4:
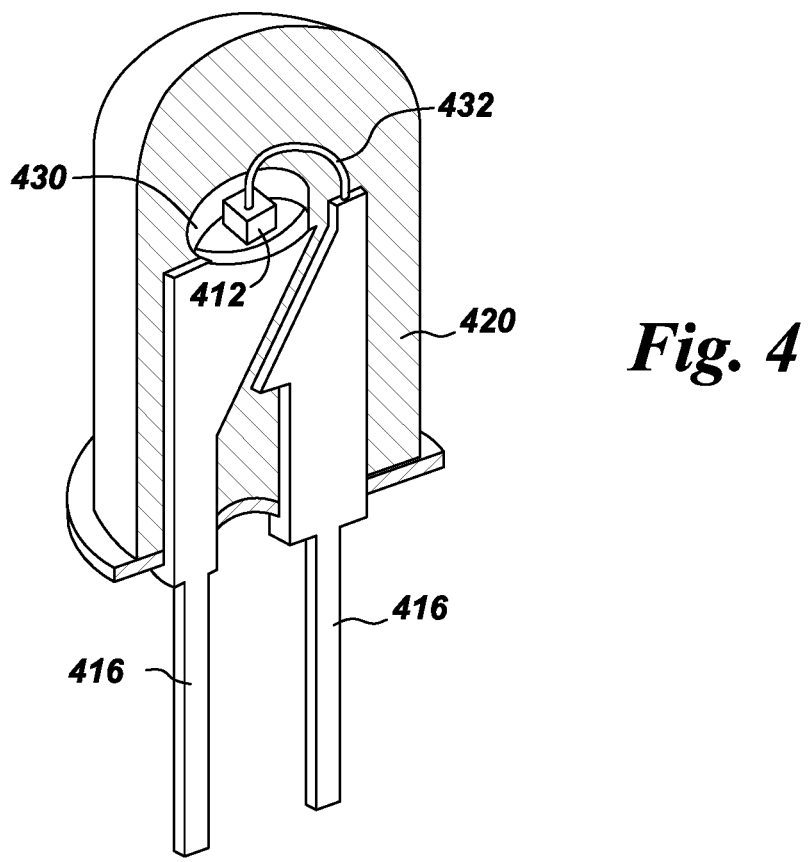
FIG. 4 is a cutaway side perspective view of a lighting apparatus in accordance with one embodiment of the invention.

As shown in a fourth structure in FIG. 4, the LED chip 412 may be mounted in a reflective cup 430. The cup 430 may be made from or coated with a dielectric material, such as alumina, titania, or other dielectric powders known in the art, or be coated by a reflective metal, such as aluminum or silver. The remainder of the structure of the embodiment of FIG. 4 is the same as those of any of the previous figures, and can include two leads 416, a conducting wire 432, and an encapsulant material 420. The reflective cup 430 is supported by the first lead 416 and the conducting wire 432 is used to electrically connect the LED chip 412 with the second lead 416.

Figure 5:
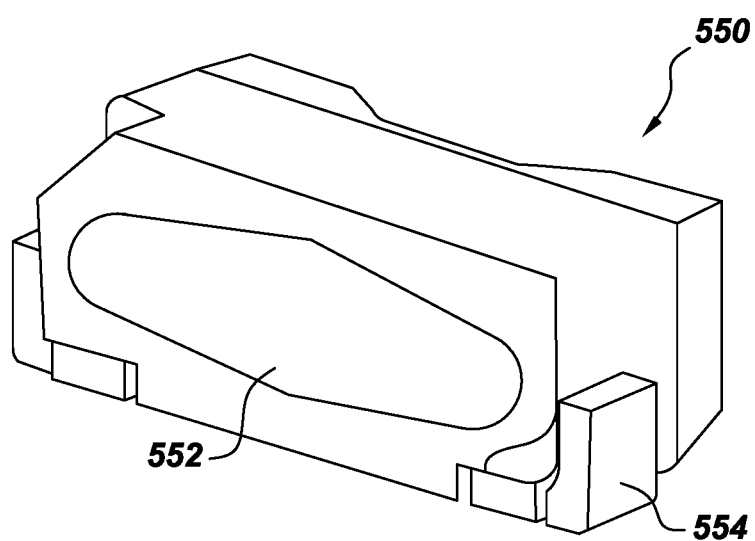
FIG. 5 is a schematic perspective view of a surface-mounted device (SMD) backlight LED.

Another structure (particularly for backlight applications) is a surface mounted device ("SMD") type light emitting diode 550, e.g. as illustrated in FIG. 5. This SMD is a "side-emitting type" and has a light-emitting window 552 on a protruding portion of a light guiding member 554. An SMD package may comprise an LED chip as defined above, and a phosphor material that is excited by the light emitted from the LED chip. Other backlight devices include, but are not limited to, TVs, computers, smartphones, tablet computers and other handheld devices that have a display including a semiconductor light source; and a color stable $Mn^{4+}$ doped phosphor according to the present invention.

When used with an LED emitting at from 350 to 550 nm and one or more other appropriate phosphors, the resulting lighting system will produce a light having a white color. Lamp 10 may also include scattering particles (not shown), which are embedded in the encapsulant material. The scattering particles may comprise, for example, alumina or titania. The scattering particles effectively scatter the directional light emitted from the LED chip, preferably with a negligible amount of absorption.

In addition to the color stable $Mn^{4+}$ doped phosphor, phosphor composition 22 may include one or more other phosphors. When used in a lighting apparatus in combination with a blue or near UV LED emitting radiation in the range of about 250 to 550 nm, the resultant light emitted by the assembly will be a white light. Other phosphors such as green, blue, yellow, red, orange, or other color phosphors may be used in the blend to customize the white color of the resulting light and produce specific spectral power distributions. Other materials suitable for use in phosphor composition 22 include electroluminescent polymers such as polyfluorenes, preferably poly(9,9-dioctyl fluorene) and copolymers thereof, such as poly(9,9'-dioctylfluorene-co-bis-N,N'-(4-butylphenyl)diphenylamine) (F8-TFB); poly (vinylcarbazole) and polyphenylenevinylene and their derivatives. In addition, the light emitting layer may include a blue, yellow, orange, green or red phosphorescent dye or metal complex, or a combination thereof. Materials suitable for use as the phosphorescent dye include, but are not limited to, tris(1-phenylisoquinoline) iridium (III) (red dye), tris(2-phenylpyridine) iridium (green dye) and Iridium (III) bis(2-(4,6-difluorephenyl)pyridinato-N,C2) (blue dye). Commercially available fluorescent and phosphorescent metal complexes from ADS (American Dyes Source, Inc.) may also be used. ADS green dyes include ADS060GE, ADS061GE, ADS063GE, and ADS066GE, ADS078GE, and ADS090GE. ADS blue dyes include ADS064BE, ADS065BE, and ADS070BE. ADS red dyes include ADS067RE, ADS068RE, ADS069RE, ADS075RE, ADS076RE, ADS067RE, and ADS077RE.

Suitable phosphors for use in phosphor composition 22 include, but are not limited to: $((Sr_{1-z}(Ca, Ba, Mg, Zn)_z)_{1-(x+w)}(Li, Na, K, Rb)_w Ce_x)_3(Al_{1-y}Si_y)O_{4+y+3(x-w)}F_{1-y-3(x-w)}$, $0<x\leq0.10$, $0\leq y\leq0.5$, $0\leq z\leq0.5$, $0\leq w\leq x$; $(Ca, Ce)_3Sc_2Si_3O_{12}$ (CaSiG); $(Sr,Ca,Ba)_3Al_{1-x}Si_xO_{4+x}F_{1-x}:Ce^{3+}$ (SASOF)); $(Ba,Sr,Ca)_5(PO_4)_3(Cl,F,Br,OH):Eu^{2+},Mn^{2+}$; $(Ba,Sr,Ca)BPO_5:Eu^{2+},Mn^{2+}$; $Sr_2Si_3O_8*2SrCl_2:Eu^{2+}$; $(Ca,Sr,Ba)_3MgSi_2O_8:Eu^{2+},Mn^{2+}$; $BaAl_8O_{13}:Eu^{2+}$; $2SrO*0.84P_2O_5*0.16B_2O_3:Eu^{2+}$; $(Ba,Sr,Ca)MgAl_{10}O_{17}:Eu^{2+},Mn^{2+}$; $(Ba,Sr,Ca)Al_2O_4:Eu^{2+}$; $(Y,Gd,Lu,Sc,La)BO_3:Ce^{3+},Tb^{3+}$; $ZnS:Cu^+,Cl^-$; $ZnS:Cu^+,Al^{3+}$; $ZnS:Ag^+,Cl^-$; $ZnS:Ag^+,Al^-$; $(Ba,Sr,Ca)_2(Mg,Zn)Si_2O_7:Eu^{2+}$; $(Sr,Ca,Ba)(Al,Ga,In)_2S_4:Eu^{2+}$; $(Ca,Sr)_8(Mg,Zn)(SiO_4)_4Cl_2:Eu^{2+},Mn^{2+}$; $Na_2Gd_2B_2O_7:Ce^{3+}, Tb^{3+}$; $(Sr,Ca,Ba,Mg,Zn)_2P_2O_7:Eu^{2+},Mn^{2+}$; $(Gd,Y,Lu,La)_2O_3:Eu^{3+},Bi^{3+}$; $(Gd,Y,Lu,La)_2O_2S:Eu^{3+},Bi^{3+}$; $(Gd,Y,Lu,La)VO_4:Eu^{3+},Bi^{3+}$; $(Ca,Sr)S:Eu^{2+},Ce^{3+}$; $SrY_2S_4:Eu^{2+}$; $CaLa_2S_4:Ce^{3+}$; $(Ba,Sr,Ca)MgP_2O_7:Eu^{2+},Mn^{2+}$; $Ca_3(SiO_4)Cl_2:Eu^{2+}$; $(Lu,Sc,Y,Tb)_{2-u-v}Ce_vCa_{1+u}Li_wMg_{2-w}P_w(Si,Ge)_{3-w}O_{12-u/2}$ (where $-0.5\leq u\leq1$, $0<v\leq0.1$, and $0\leq w\leq0.2$); $(Lu,Ca,Li,Mg,Y)$, α-SiAlON doped with $Eu^{2+}$ and/or $Ce^{3+}$; $(Ca,Sr,Ba)SiO_2N_2:Eu^{2+},Ce^{3+}$; β-SiAlON: $Eu^{2+}$, $3.5MgO*0.5MgF_2*GeO_2:Mn^{4+}$; $Ca_{1-c-f}Ce_cEu_fAl_{1+c}Si_{1-c}N_3$, (where $0\leq c\leq0.2$, $0\leq f\leq0.2$); $Ca_{1-h-r}Ce_hEu_rAl_{1-h}(Mg,Zn)_hSiN_3$, (where $0\leq h\leq0.2$, $0\leq r\leq0.2$); and $Ca_{1-2s-t}Ce_s(Li,Na)_sEu_tAlSiN_3$, (where $0\leq s\leq0.2$, $0\leq f\leq0.2$, $s+t>0$).

The ratio of each of the individual phosphors in the phosphor blend may vary depending on the characteristics of the desired light output. The relative proportions of the individual phosphors in the various embodiment phosphor blends may be adjusted such that when their emissions are blended and employed in an LED lighting device, there is produced visible light of predetermined x and y values on the CIE chromaticity diagram. As stated, a white light is preferably produced. This white light may, for instance, may possess an x value in the range of about 0.20 to about 0.55, and a y value in the range of about 0.20 to about 0.55. As stated, however, the exact identity and amounts of each phosphor in the phosphor composition can be varied according to the needs of the end user. For example, the material can be used for LEDs intended for liquid crystal display (LCD) backlighting. In this application, the LED color point would be appropriately tuned based upon the desired white, red, green, and blue colors after passing through an LCD/color filter combination.

The color stable $Mn^{4+}$ doped phosphors of the present invention may be used in applications other than those described above. For example, the material may be used as a phosphor in a fluorescent lamp, in a cathode ray tube, in a plasma display device or in a liquid crystal display (LCD). The material may also be used as a scintillator in an electromagnetic calorimeter, in a gamma ray camera, in a computed tomography scanner or in a laser. These uses are merely exemplary and not limiting.

EXAMPLES

Phosphor Post-Treatment
Procedure

A nearly saturated solution of $K_2SiF_6$ in 49% HF was prepared by adding 4.2 g $K_2SiF_6$ per 100 ml 49% HF to form a suspension which was vacuum filtered to remove excess solids. Approximately 2 vol % 49% HF was added to the saturated solution, to form a nearly saturated solution. The slurry was mixed with 500 ml of the nearly saturated at a rate of about 6 ml solution per 1 g product and stirred for about 20 minutes. The treated product was vacuum filtered, rinsed once with acetic acid and three times with acetone, and then dried under vacuum. The dried powder was sifted through a 170-mesh screen, and annealed under an atmosphere composed of 20% $F_2$/80% nitrogen for about 8 hours at 540° C. The slurry was mixed with 1000 ml of a solution of 49% HF nearly saturated with $K_2SiF_6$ at a rate of about 12 ml solution per 1 g product and stirred for about 20 minutes. The treated product was vacuum filtered, rinsed once with acetic acid and three times with acetone, and then dried under vacuum. The dried powder was sifted through a 170-mesh screen, and annealed under an atmosphere composed of 20% $F_2$/80% nitrogen for about 8 hours at 540° C.
Test Procedures
Silicone Tape Sample Preparation Samples were prepared by mixing 500 mg of the material to be tested with 1.50 g silicone (Sylgard 184). The mixture was degassed in a vacuum chamber for about 15 minutes. The mixture (0.70 g) was poured into a disc-shaped template (28.7 mm diameter and 0.79 mm thick) and baked for 30 minutes at 90° C. The sample was cut into squares of size approximately 5 mm×5 mm for testing.
Stability Testing
High Light Flux Conditions A laser diode emitting at 446 nm was coupled to an optical fiber with a collimator at its other end. The power output was 310 mW and the beam diameter at the sample was 700 microns. This is equivalent to a flux of 80 W/cm² on the sample surface. The spectral power distribution (SPD) spectrum that is a combination of the scattered radiation from the laser and the emission from the excited phosphor is collected with a 1 meter (diameter) integrating sphere and the data processed with the spectrometer software (Specwin). At intervals of two minutes, the integrated power from the laser and the phosphor emission were recorded over a period of about 21 hours by integrating the SPD from 400 nm to 500 nm and 550 nm to 700 nm respectively. The first 90 minutes of the measurement are discarded to avoid effects due to the thermal stabilization of the laser. The percentage of intensity loss due to laser damage is calculated as follows:

$$\text{Intensity loss (\%)} = 100 \frac{(\text{Power} - \text{Initial power})}{\text{Initial power}}$$

While only the emitter power from the phosphor is plotted, the integrated power from the laser emission as well as its peak position was monitored to ensure that the laser remained stable (variations of less than 1%) during the experiment.

Examples 1-4 Microwave Digestion of PFS Phosphor

PFS phosphor containing 2.45 wt % manganese (4 g.) was dispersed in 49% HF or a saturated solution of $K_2SiF_6$ as shown in Table 1. The samples were placed in capped teflon vials in the reaction chamber of an UltraWAVE Microwave Digestion System reactor. Conditions for the runs, including time, temperature, pressure and sample composition, are shown in Table 1.

TABLE 1

| Example no. | Sample Code | mL 49% HF | mL treat. Soln. | Temp, ° C. | Time, hours | Pressure, bar |
|---|---|---|---|---|---|---|
| 1-1 | C100715#1-TMW100CHF | 8 | 0 | 100 | 4 | 60 |
| 1-2 | C100715#1-TMW100CTS | 0 | 8 | | | |
| 1-3 | C100715#1-TMW100CTS2 | 8 | 0 | | | |
| 2-1 | C100715T | 8 | 0 | 200 | 4 | 90 |
| 2-2 | C100715T | 0 | 8 | | | |
| 2-3 | C100715T | 8 | 0 | | | |
| 3-1 | C100715#1-TMW3AT | 8 | 0 | 130 | 4 | 76 |
| 3-2 | C100715#1-TMW3BT | 0 | 8 | | | |
| 3-3 | C100715#1-TMW3CT | 0 | 16 | | | |
| 3-4 | C100715#1TMW3-TGAT(183) | 3 − 2 + 3 − 3 | | | | |
| 4-1 | C100715#1-TMW4AT | 0 | 8 | 160 | 1 | 100 |
| 4-2 | C100715#1-TMW4BT | | 16 | | | |
| COMPARATIVE EXAMPLE 1 | C100715T | na | na | na | na | na |

All of the samples from Example 2 turned a deep purple and were not subjected to analysis The digested phosphors were isolated and formulated into a tape. For Example 3-4, the phosphor of Examples 3-2 and 3-3 was combined and post-treated as described above. Properties of the tapes are shown in Table. 2.

TABLE 2

| Example no. | QE (vs.214T) | Bleed-through | Lifetime (ms) | $R_{631}$ | |
|---|---|---|---|---|---|
| COMPARATIVE EXAMPLE 1 | | 68.1% | | | |
| 1-1 | 69.6% | 102.17% | 22.0% | 7.323 | 12.7% |
| 1-2 | 69.4% | 101.91% | 21.6% | 7.317 | 12.3% |
| 1-3 | 69.5% | 102.07% | 22.2% | 7.320 | 11.9% |
| 3-1 | 71.1% | 104.43% | 25.4% | 7.434 | 11.4% |
| 3-2 | 71.3% | 104.73% | 23.7% | 7.367 | 12.3% |
| 3-3 | 71.6% | 105.09% | 24.6% | 7.376 | 12.1% |
| 3-4 | 102.6% | 150.65% | 24.3% | 8.356 | 13.3% |
| 4-1 | 72.0% | 104.82% | 22.4% | 7.381 | 12.8% |
| 4-2 | 71.4% | 150.65% | 23.8% | 7.357 | 12.3% |

Particle size data for the phosphor powder of Examples 1-2, 1-3 and 3-4 is shown in Table 3.

TABLE 3

| Example no. | Powder Abs 300 nm | d10 | d90 | b80 |
|---|---|---|---|---|
| 1-2 | | 25 | 49 | 0.69 |
| 1-3 | | 24 | 47 | 0.70 |
| 3-4 | 26.1 | 21.6 | 41 | |

Observations
Run 1 QE remained constant and d50 increased from 28 to 31 microns
Run 4 Mn leaching observed but no change in sample color from microwave treatment While only certain features of the invention have been illustrated and described herein, many modifications and changes will occur to those skilled in the art. It is, therefore, to be understood that the appended claims are intended to cover all such modifications and changes as fall within the true spirit of the invention.

A number of variations of features of some embodiments may be provided. For example, in some embodiments, a process for synthesizing a color stable Mn4+ doped phosphor, the process comprising applying pressure to a dispersion at a temperature less than 200° C. to form a first phosphor product, the dispersion comprising a compound of formula I, a compound of formula II and hydrofluoric acid;

$$A_x [MF_y]:Mn^{4+} \quad \text{I}$$

$$A_x [MF_y] \quad \text{II}$$

wherein A is Li, Na, K, Rb, Cs, or a combination thereof; M is Si, Ge, Sn, Ti, Zr, Al, Ga, In, Sc, Hf, Y, La, Nb, Ta, Bi, Gd, or a combination thereof; x is the absolute value of the charge of the [MFy] ion; and y is 5, 6 or 7.

In some embodiments, process may be provided comprising contacting a compound of formula I with a fluorine-containing oxidizing agent in gaseous form at an elevated temperature to form phosphor product;

Ax[MFy]:Mn4+    I dispersing the phosphor product in a solution comprising a compound of formula II and hydrofluoric acid; and Ax[MFy]    II applying pressure to the dispersion at a temperature less than 200° C.; wherein A is Li, Na, K, Rb, Cs, or a combination thereof; M is Si, Ge, Sn, Ti, Zr, Al, Ga, In, Sc, Hf, Y, La, Nb, Ta, Bi, Gd, or a combination thereof; x is the absolute value of the charge of the [MFy] ion; and y is 5, 6 or 7.

In some embodiments, the pressure is less than 100 bar. In some embodiments, the pressure ranges from about 60 bar to about 100 bar. In some embodiments, the pressure is applied for a time less than 4 hours. In some embodiments, the pressure is applied for a time less than 1 hour. In some embodiments, the temperature ranges from about 100° C. to less than 200° C. In some embodiments, the temperature ranges from about 130° C. to 160° C. In some embodiments, the process additionally comprising exposing the dispersion to microwave radiation while applying pressure. In some embodiments, the process additionally comprising contacting the color stable Mn4+ doped phosphor in particulate form with a solution of a composition of formula II in aqueous hydrofluoric acid. In some embodiments, the fluorine-containing oxidizing agent is F2. In some embodiments, M is Si, Ge, Sn, Ti, Zr, or a combination thereof. In some embodiments, A is Na, K, Rb, Cs, or a combination thereof, M is Si, Ge, Ti, or a combination thereof; and Y is 6. In some embodiments, the compound of formula I is K2SiF6:Mn4+.

The invention claimed is:

1. A process comprising
dispersing a compound of formula I in a solution comprising a compound of formula II to form a dispersion;

$$A_x [MF_y]:Mn^{4+} \quad \text{I}$$

$$A_x [MF_y] \quad \text{II}$$

applying pressure to the dispersion at a temperature less than 200° C. to form a phosphor product; and
contacting the phosphor product with a fluorine-containing oxidizing agent in gaseous form at an elevated temperature;
wherein
A is Li, Na, K, Rb, Cs, or a combination thereof;
M is Si, Ge, Sn, Ti, Zr, Al, Ga, In, Sc, Hf, Y, La, Nb, Ta, Bi, Gd, or a combination thereof;
x is the absolute value of the charge of the [MF$_y$] ion; and
y is 5, 6 or 7.

2. A process according to claim 1, wherein the pressure is less than 100 bar.

3. A process according to claim 1, wherein the pressure ranges from about 60 bar to about 100 bar.

4. A process according to claim 1, wherein the pressure is applied for a time less than 4 hours.

5. A process according to claim 1, wherein the pressure is applied for a time less than 1 hour.

6. A process according to claim 1, wherein the temperature ranges from about 100° C. to less than 200° C.

7. A process according to claim 1, wherein the temperature ranges from about 130° C. to 160° C.

8. A process according to claim 1, additionally comprising exposing the dispersion to microwave radiation while applying pressure.

9. A process according to claim 1, additionally comprising contacting the color stable Mn4+ doped phosphor in particulate form with a solution of a composition of formula II in aqueous hydrofluoric acid.

10. A process according to claim 1, wherein the fluorine-containing oxidizing agent is $F_2$.

11. A process according to claim 1, wherein M is Si, Ge, Sn, Ti, Zr, or a combination thereof.

12. A process according to claim 1, wherein
A is Na, K, Rb, Cs, or a combination thereof;
M is Si, Ge, Ti, or a combination thereof; and
Y is 6.

13. A process according to claim 1, wherein the compound of formula I is $K_2SiF_6:Mn^{4+}$.

14. A process for synthesizing a color stable $Mn^{4+}$ doped phosphor, the process comprising applying pressure to a dispersion at a temperature less than 200° C. to form a first phosphor product, the dispersion comprising a compound of formula I, a compound of formula II and hydrofluoric acid;

$$A_x[MF_y]:Mn^{4+} \qquad I$$

$$A_x[MF_y] \qquad II$$

wherein
A is Li, Na, K, Rb, Cs, or a combination thereof;
M is Si, Ge, Sn, Ti, Zr, Al, Ga, In, Sc, Hf, Y, La, Nb, Ta, Bi, Gd, or a combination thereof;
x is the absolute value of the charge of the $[MF_y]$ ion; and
y is 5, 6 or 7.

15. A process comprising
contacting a compound of formula I with a fluorine-containing oxidizing agent in gaseous form at an elevated temperature to form phosphor product;

$$A_x[MF_y]:Mn^{4+} \qquad I$$

dispersing the phosphor product in a solution comprising a compound of formula II and hydrofluoric acid; and $$A_x[MF_y] \qquad II$$

applying pressure to the dispersion at a temperature less than 200° C.;
wherein
A is Li, Na, K, Rb, Cs, or a combination thereof;
M is Si, Ge, Sn, Ti, Zr, Al, Ga, In, Sc, Hf, Y, La, Nb, Ta, Bi, Gd, or a combination thereof;
x is the absolute value of the charge of the $[MF_y]$ ion; and
y is 5, 6 or 7.

16. A process according to claim 15, wherein the pressure is less than 100 bar.

17. A process according to claim 15, wherein the pressure ranges from about 60 bar to about 100 bar.

18. A process according to claim 15, wherein the pressure is applied for a time less than 4 hours.

19. A process according to claim 15, wherein the pressure is applied for a time less than 1 hour.

20. A process according to claim 15, wherein the temperature ranges from about 100° C. to less than 200° C.

21. A process according to claim 15, wherein the temperature ranges from about 130° C. to 160° C.

22. A process according to claim 15, additionally comprising exposing the dispersion to microwave radiation while applying pressure.

23. A process according to claim 15, additionally comprising contacting the color stable Mn4+ doped phosphor in particulate form with a solution of a composition of formula II in aqueous hydrofluoric acid.

24. A process according to claim 15, wherein the fluorine-containing oxidizing agent is $F_2$.

25. A process according to claim 15, wherein M is Si, Ge, Sn, Ti, Zr, or a combination thereof.

26. A process according to claim 15, wherein
A is Na, K, Rb, Cs, or a combination thereof;
M is Si, Ge, Ti, or a combination thereof; and
Y is 6.

27. A process according to claim 15, wherein the compound of formula I is $K_2SiF_6:Mn^{4+}$.

* * * * *